US012710307B2

(12) United States Patent
Ilie et al.

(10) Patent No.: US 12,710,307 B2
(45) Date of Patent: Aug. 18, 2026

(54) METHOD FOR DETECTING TANDEM RIDE CONDITION ON ELECTRIC SCOOTER, ELECTRIC SCOOTER CONTROL SYSTEM, AND ELECTRIC SCOOTER

(71) Applicant: BOLT TECHNOLOGY OÜ, Tallinn (EE)

(72) Inventors: Catalin-Andrei Ilie, Ploiesti (RO); Amatia Lomax, Tallinn (EE); Yurii Karadzhov, Tallinn (EE); Vadim Gerassimov, Tallinn (EE); Artur Sachanka, Tallinn (EE)

(73) Assignee: BOLT TECHNOLOGY OÜ, Tallinn (EE)

( * ) Notice: Subject to any disclaimer, the term of this patent is extended or adjusted under 35 U.S.C. 154(b) by 158 days.

(21) Appl. No.: 18/717,334

(22) PCT Filed: Dec. 7, 2021

(86) PCT No.: PCT/EP2021/084492
§ 371 (c)(1),
(2) Date: Jun. 6, 2024

(87) PCT Pub. No.: WO2023/104288
PCT Pub. Date: Jun. 15, 2023

(65) Prior Publication Data
US 2025/0044145 A1 Feb. 6, 2025

(51) Int. Cl.
*G01G 19/08* (2006.01)
*B62J 45/412* (2020.01)
(Continued)

(52) U.S. Cl.
CPC .......... *G01G 19/086* (2013.01); *B62J 45/412* (2020.02); *B62J 45/414* (2020.02); *G01G 19/4142* (2013.01)

(58) Field of Classification Search
None
See application file for complete search history.

(56) References Cited

U.S. PATENT DOCUMENTS 6,347,269 B1 * 2/2002 Hayakawa ........... G01G 19/086 702/175
2007/0135982 A1 * 6/2007 Breed ..................... E05F 15/43 701/36

(Continued)

FOREIGN PATENT DOCUMENTS

GB 2579559 A 7/2020
WO WO-2011003461 A1 * 1/2011 .............. G01P 21/00

OTHER PUBLICATIONS

International Search Report and Written Opinion in PCT/EP2021/084492, mailed Oct. 7, 2022, 9 pages.

*Primary Examiner* — Daniel L Greene
(74) *Attorney, Agent, or Firm* — Meunier Carlin & Curfman LLC

(57) ABSTRACT

A method for detecting a tandem ride condition on an electric scooter (10), the scooter (10) comprising an electric motor (16), the method comprising estimating (110) a mass on the scooter (10), and comparing (120) the estimated mass to a statistical mass value determined based on stored data associated with a user profile. Furthermore, an electric scooter control system (30) and an electric scooter (10) are also disclosed.

13 Claims, 3 Drawing Sheets

(51) Int. Cl.
*B62J 45/414* (2020.01)
*G01G 19/414* (2006.01)

(56) References Cited

U.S. PATENT DOCUMENTS

| | | | | |
|---|---|---|---|---|
| 2016/0355189 | A1* | 12/2016 | Lin | B60L 3/0061 |
| 2017/0259697 | A1* | 9/2017 | Dastoor | B60L 3/12 |
| 2018/0170394 | A1* | 6/2018 | Bedegi | B60T 8/1708 |
| 2018/0245966 | A1 | 8/2018 | Mittal et al. | |
| 2020/0124430 | A1* | 4/2020 | Bradlow | B62J 45/412 |
| 2020/0377106 | A1 | 12/2020 | Giraud et al. | |
| 2021/0053643 | A1 | 2/2021 | Murphy | |

* cited by examiner

METHOD FOR DETECTING TANDEM RIDE CONDITION ON ELECTRIC SCOOTER, ELECTRIC SCOOTER CONTROL SYSTEM, AND ELECTRIC SCOOTER

CROSS-REFERENCE TO RELATED APPLICATIONS

This application is a U.S. National Phase Application of International patent application number PCT/EP2021/084492 filed on Dec. 7, 2021, which is hereby incorporated herein by reference in its entirety.

FIELD OF THE INVENTION

The present invention relates in general to electric scooters. In particular, however, not exclusively, the present invention concerns so called electric kick scooters in which a person or persons riding the scooter is/are standing on the scooter. More particularly, the present invention relates to safety functions of the scooter, namely detection of tandem ride condition.

BACKGROUND

Tandem riding has been shown to be one of the main causes of accidents related to electric scooters. In order to avoid these kinds of accidents, it would be beneficial to prevent people from riding the scooters so that there are multiple persons simultaneously on the scooter. Thus, there is a need to develop electric scooters so that said kinds of accidents can be avoided.

SUMMARY

An objective of the present invention is to provide a method for detecting a tandem ride condition on an electric scooter, an electric scooter control system, and an electric scooter. Another objective of the present invention is that the method, the electric scooter control system, and the electric scooter detects the tandem ride condition.

The objectives of the invention are reached by a method for detecting a tandem ride condition on an electric scooter, an electric scooter control system, and an electric scooter as defined by the respective independent claims.

According to a first aspect, a method for detecting a tandem ride condition on an electric scooter is provided, wherein the scooter comprises an electric motor. The method comprises estimating a mass on the scooter and comparing the estimated mass to a statistical mass value determined based on stored data associated with a user profile.

The tandem ride condition as referred to herein refers to a situation where the electric scooter is ridden simultaneously by a plurality of persons, such as two or three or more. For example, one person may be holding the handlebar and steering the scooter, while another person or persons is/are also on the scooter behind of said one person, however, may hold on to said one person or the handlebar.

The determination of the mass may, preferably, be indirect in that the mass on the scooter is not directly determined, such as by a scale or weighing device.

The estimation may, thus, be based on determining movement data of the scooter, and determining force or power data of the motor. The movement data may include acceleration data measured by an inertial measurement unit of the scooter. Furthermore, the method may comprise comparing the force or power data and the acceleration data, and determining a coefficient based on the comparison, such as fitting the two data relative to each other. The coefficient may thus be utilized to compare the relation between the actual measured acceleration and the force produced by the motor into said direction.

In various embodiments, the movement data may include speed data of the scooter.

In various embodiments, the acceleration data may be measured by a three-axis accelerometer of the inertial measurement unit of the scooter.

The speed data may preferably relate to a wheel speed of the scooter.

In some embodiments, the estimating comprises determining the force or power data based on electrical power of the motor and the speed data. Furthermore the electrical power may be determined by at least one or two of: motor current, motor voltage.

In some embodiments, the estimated mass may be scaled by a correction factor, wherein the correction factor takes into account at least an electric scooter mass.

Alternatively or in addition, the estimated mass may be scaled by a correction factor, wherein the correction factor takes into account a driver mass.

The method may in various embodiments comprise storing the estimated mass to a memory in association with the user profile.

Preferably, the driver mass may be adapted based on previous estimated masses associated with the user profile.

The present invention provides a method for detecting a tandem ride condition on an electric scooter, an electric scooter control system, and an electric scooter. The present invention provides advantages over known solutions in that tandem riding can be detected more accurately for each user associated with some user profile.

Various other advantages will become clear to a skilled person based on the following detailed description.

The "primary direction" of the electric scooter as referred to herein is the direction into which the scooter is moving when the steering means of the scooter is substantially in the neutral position. In other words, the scooter is being ridden or kept straight.

The expression "a number of" may herein refer to any positive integer starting from one (1).

The expression "a plurality of" may refer to any positive integer starting from two (2), respectively.

The terms "first", "second" and "third" are herein used to distinguish one element from other element, and not to specially prioritize or order them, if not otherwise explicitly stated.

The exemplary embodiments of the present invention presented herein are not to be in-terpreted to pose limitations to the applicability of the appended claims. The verb "to comprise" is used herein as an open limitation that does not exclude the existence of also unrecited features. The features recited in depending claims are mutually freely combin-able unless otherwise explicitly stated.

The novel features which are considered as characteristic of the present invention are set forth in particular in the appended claims. The present invention itself, however, both as to its construction and its method of operation, together with additional objectives and advantages thereof, will be best understood from the following description of specific embodiments when read in connection with the accompanying drawings.

BRIEF DESCRIPTION OF FIGURES

Some embodiments of the invention are illustrated by way of example, and not by way of limitation, in the figures of the accompanying drawings.

DETAILED DESCRIPTION OF SOME EMBODIMENTS

Figures 1, 2:
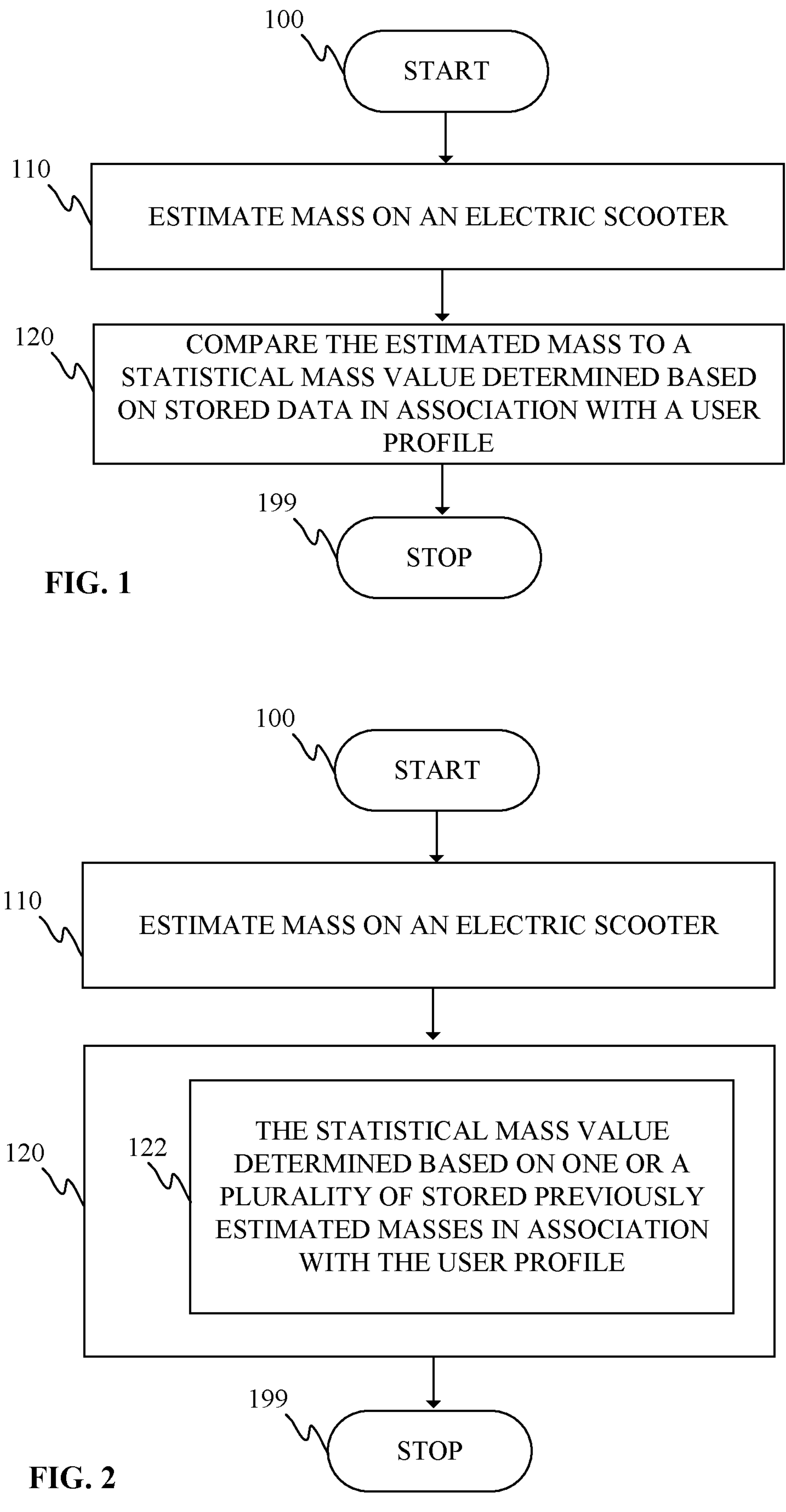
FIG. 1 shows a flow diagram of a method.
FIG. 2 shows a flow diagram of a method.

FIG. 1 shows a flow diagram of a method. The method is for detecting a tandem ride condition on an electric scooter, wherein the scooter comprises an electric motor.

Item 100 refers to a start-up phase of the method. Suitable equipment and components are obtained, and (sub-)systems assembled and configured for operation, such having the basic functions of the electric scooter operable. In various embodiment, a processing unit of the scooter in connection with a memory may be configured to able to process and store information, such as user information or user ride habit information, associated with user profiles.

Figures 3, 4:
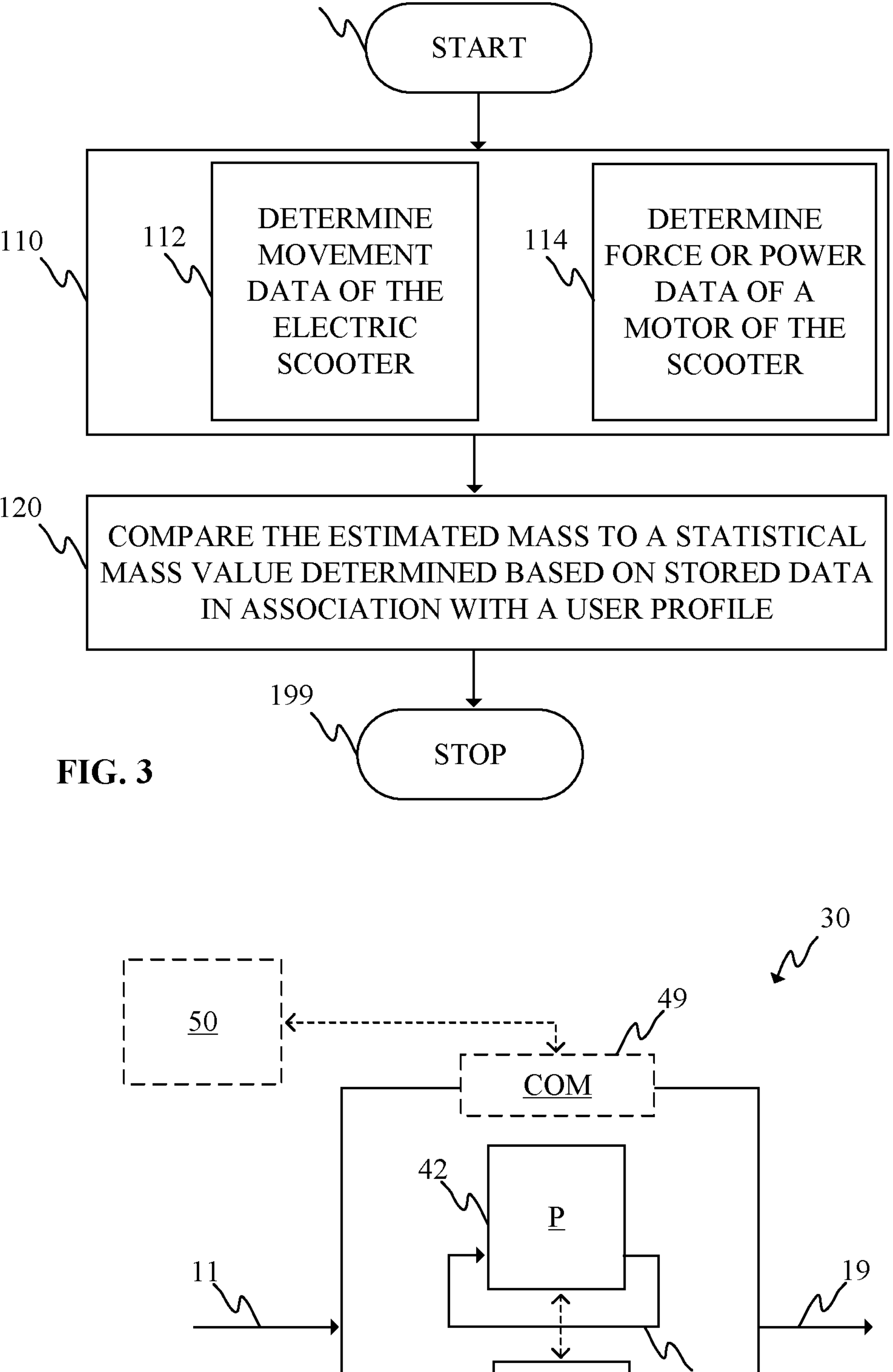
FIG. 3 shows a flow diagram of a method.
FIG. 4 illustrates schematically an electric scooter control system.

The "items" in connection with FIGS. 1-3 may be method steps or features of a controlling unit and/or the scooter itself, for instance. For example, item 100 may include a method step relating to the arrangement of at least necessary systems and components.

Item 110 refers to estimating a mass on the scooter, such as the total mass of the person or persons on the scooter, and additionally other items thereon, if any.

The estimation is, preferably, based on indirect means of estimating the mass, that is not necessarily including directly estimating or measuring the mass based on a separate weighing device arranged to the scooter. The indirect means may comprise, for instance, utilizing information from inertial measurement unit of the scooter and/or from motor controller, and/or from the motor quantities, such as related to electrical parameters or speed. Thus, the indirect way of estimating the mass may be based on deriving the mass estimation from movement related parameters or data of the scooter obtained with respect to the scooter when it is or has been moving. It may be that the indirect estimation is not even possible at times when the scooter stands still.

Item 120 refers to comparing the estimated mass to a statistical mass value determined based on stored data associated with a user profile, that is, the corresponding user profile with respect to the current user.

The method may, thus, also comprise, prior to or after the estimation of the mass, iden-tifying the user. The identification may be performed when the user starts to use the scooter or when he/she starts the scooter, such as the operating system thereof. This may be performed by the user inputting information via a mobile terminal, by an identification tag, or via a user interface of the scooter.

Preferably, the method comprises recording the estimated mass for each ride associated to the corresponding user profile. Thus, the statistical mass value may be based on one or several previously estimated masses for said user profile.

The method may, therefore, comprise classifying the current ride, or even one or some of the previous rides, as exhibiting a tandem ride condition if the estimated mass of the current ride, or of one or some of the previous rides, is higher than the statistical mass value.

In various embodiments, the statistical mass value is a median or an average historic mass estimate for that user profile. The statistical mass value alternatively be some other mathematically rigorously definable value used in statistics. Of course, a factor may be used, such as a coefficient (coefficient k times the statistical mass), by which sensitivity, precision, or prior beliefs about the distribution of second rider masses may be adjusted as desired.

The method execution may, depending on the embodiment, be ended at item 199.

Related to various embodiments, the method may, in addition, include utilizing the detection of the tandem ride condition. The utilizing may entail storing the detection in the user profile so that the habit of tandem riding may be monitored, such as locally on the scooter database and/or on an external database to which the scooter may occasionally or substantially continuously be in communication connection with. Alternatively or in addition, the detection of the tandem ride condition may be utilized to give an alarm or warning to the user via a user interface and/or separate alarming device. The alarm or warning may be given audibly and/or visually, such as via a screen of the user interface. Still alternatively or in addition, the detection of the tandem ride condition may be utilized to shut down the scooter immediately or with a delay (which the delay may be notified to the user prior to the shutdown) in order to end the tandem ride.

FIG. 2 shows a flow diagram of a method. The method is for detecting a tandem ride condition on an electric scooter, wherein the scooter comprises an electric motor.

Items 100 and 110 may be essentially similar or even identical to ones shown in FIG. 1 and described in connection thereto.

Item 122 may refer to having the statistical mass value determined based on one or a plurality of stored previously estimated masses in association with the user profile. Thus, the user may have ridden the scooter, or even a different scooter which is in connection to a common database including information regarding the user profiles, for instance, once or more than once before, and thus the user profile data may include one or several stored previously estimated mass values. In case of only one previously estimated mass value, the statistical mass value would essentially mean said value directly or being adapted by a coefficient.

The method execution may, depending on the embodiment, be ended at item 199.

FIG. 3 shows a flow diagram of a method. The method is for detecting a tandem ride condition on an electric scooter, wherein the scooter comprises an electric motor.

Items 100 and 120 (or 122) may be essentially similar or even identical to ones shown in FIGS. 1 and 2 and described in connection thereto.

Item 112 may refer to determining movement data of the scooter.

In various embodiments, the movement data may include acceleration data measured by an inertial measurement unit of the scooter. In addition or alternatively, the movement data includes speed data of the scooter, such as obtained by measuring rotational speed of the motor or wheel (that is, wheel speed) of the scooter.

In some embodiments, the acceleration data may be measured by a three-axis (3-axis) accelerometer of the inertial measurement unit.

The movement data may be determined and stored for a time period, such as over the total time of one ride or at least portion of the ride, which the portion is longer than two, five, or ten seconds. Alternatively, the time period may be chosen to be very short, even less than one second, for example, one or two time instances of said period, in cases where the conditions for storing the movement data fulfills one or more pre-defined conditions. On the other hand, the total time of one ride may be up to several or tens of minutes, or even longer than that.

In various embodiments, the method may comprise applying a vehicle dynamics filter to select the time period, or “time series of data”, where the scooter motion has primarily been longitudinal, such as also minimal, if any, non-tractive effects on the movement were involved. The vehicle dynamics filter may include predefined criteria, such as speed being equal to or higher than a speed threshold, and, optionally, lower than some maximum speed, if any, and/or motor power being higher than zero, and/or lateral acceleration (in directions other than the primary direction) of the scooter being lower than some relatively low acceleration threshold value.

Examples of the one or more pre-defined conditions is that the brake of the scooter is not being activated, so that the movement data in more or less completely characterized by the force generated by the motor to move the scooter in substantially the primary direction when having one or several persons on the scooter. Alternatively or in addition, there may be a speed threshold value which is utilized so that the speed of the scooter must be equal to or higher than the speed threshold value, such as half, one, or two meters per second. Alternatively or in addition, the pre-condition(s) may include having for the time period the acceleration less than some low, such as less than one or two $m/s^2$, acceleration threshold value. In some embodiments, the acceleration threshold value related only to acceleration/deceleration in substantially other directions than the primary direction. Still a further additional or alternative pre-condition is that the motor power, such as the product of current and voltage, is more than some power threshold value. By having the power threshold value, it may be detected if the motor is at least producing power to move the scooter.

Regarding the abovementioned pre-conditions, in various embodiments, the pre-conditions may include at least one of them, some of them, or all of them.

The primary direction as referred to herein is the direction into which the scooter is moving when the steering means of the scooter is substantially in the neutral position. In other words, the scooter is being ridden or kept straight.

Item 114 may refer to determining force or power data of the motor. The force or power data may be determined based on electrical power of the motor and the speed data. In some embodiments, the electrical power may be determined based on either motor voltage or motor current, or, preferably, based on both of them.

Thus, in some embodiments, if the one or more pre-conditions are fulfilled, the estimation of mass may further include, for example, determining an estimate of force provided by the motor in the primary direction of the scooter by a ratio of power to speed. In some embodiments, the power may be determined by the product of motor current and voltage. Thus, by dividing the electrical power of the motor by the speed in the primary direction, the estimation of force into the primary direction is obtained.

In various embodiments, the estimating of the mass comprises comparing the force or power data and the acceleration data, and then determining a coefficient based on the comparison. The coefficient may thus be utilized to compare the relation between the actual measured acceleration and the force produced by the motor into said direction.

Thus, the mass on the scooter may be determined based on, e.g., ratio of the acceleration and the force produced by the motor, and optionally, comparing it to a known mass, such as a statistical value or the one indicated by the user, associated with some acceleration and/or force value(s). In case of the tandem ride condition, the acceleration tends to be less for a given force and/or power of the motor due to the higher mass. This way said coefficient may be utilized to estimate the mass.

In various embodiments, the estimated mass may be scaled by a correction factor, wherein the correction factor takes into account at least an electric scooter mass, that is, the self-mass or the mass of the scooter when it is empty of persons.

In various embodiments, alternatively or in addition, the estimated mass may be scaled by a correction factor, wherein the correction factor takes into account a driver mass, the driver mass being inputted mass by the user.

In various embodiments, alternatively or in addition, the method may comprise storing the estimated mass to a memory in association with the user profile. Thus, the user profile may accumulate mass estimations relative to the user or users.

Still further, the driver mass may be adapted based on previous estimated masses associated with the user profile.

The method execution may, depending on the embodiment, be ended at item 199.

Features described hereinabove in connection with FIGS. 1-3, even if not illustrated in said figures, can be, where appropriate, utilized in any of the methods in FIGS. 1-3. Thus, for example, feature “estimated mass may be scaled by a correction factor, wherein the correction factor takes into account at least an electric scooter mass”, even if described in connection with FIG. 3, can be implemented also in embodiments shown in FIGS. 1 and 2. This applies also to other features, such as to the ones described prior to or after said example feature.

Further features which may apply to each one of FIGS. 1-3 are described in the following.

In various embodiments, the method may comprise applying filtering, such as bandpass filtering, to remove noise from the recorded data, such as from the movement data or the force or power data. For example, the acceleration data or wheel-speed data may be filtered. Alternatively or in addition, the electrical power, and/or motor current and/or motor voltage may be filtered, such as bandpass filtered.

FIG. 4 illustrates schematically an electric scooter control system 30. The electric scooter control system 30 comprises at least a processing unit 42 and a memory 44, such as computer-readable memory storage medium being of non-transitory/volatile and/or transitory/non-volatile nature. The processing unit 42 and the memory 44 may be com-prised in a single unit or device, that is, an electric scooter controller 40, or they may be distributed to several units or devices. The memory 44 may be adapted to store instruc-tions executable by the processing unit(s) 42 for operating the scooter 10 and/or store various information related to the operation of the scooter, such as the estimated masses and the data associated with one or several user profiles as contemplated hereinabove with respect to FIGS. 1-3.

The processing unit 42 of the system 30 may, preferably, be arranged to receive input data 11, which may include information regarding operation of the electric scooter 10. The input data 11 may be received via an input of the processing unit 42 or the electric scooter controller 40, for instance. The information may include, for example, movement data and/or information about electrical quantities, such as of the motor of the scooter 10. The movement data may include, for example, acceleration and/or speed data, such as from an accelerometer, and/or wheel or motor encoder or the like for measuring rotational speed of the motor 16 and/or wheel.

Furthermore, the processing unit 42 of the system 30 may, preferably, be arranged to utilize the input data 11 for various tasks. Particularly, the input data 11 may be utilized to detect of there is a tandem ride condition related to the electric scooter 10.

The tandem ride condition as referred to herein refers to a situation where the electric scooter is ridden simultaneously by a plurality of persons, such as two or three or more. For example, one person may be holding the handlebar and steering the scooter, while another person or persons is/are also on the scooter behind of said one person, however, may hold on to said one person or the handlebar.

The processing unit 42 of the system 30 or the electric scooter controller 40, may, preferably, be arranged to generate an output or control signals or signals 19, such as via output(s) thereof. The output or control signal(s) 19 may be generated in response to the detection of the tandem ride condition, for instance. However, the output or control sig-nal(s) 19 may also be arranged to implement other tasks as well.

For example, the output or control signal(s) 19 may be transmitted to another unit or device of the electric scooter, such as being separate unit or device relative to the electric scooter controller 40. On the other hand, as illustrated in FIG. 4, the output or control signal(s) 19 may be utilized directly within the processing unit 42, such as by preventing the operation of the electric scooter, for instance, if the tandem ride condition is detected.

Optionally, the electric scooter control system 30 may comprise a communication device 49 for communication outside the system 30 or even outside the scooter, such as via the internet. For example, information inputted via a user interface of the scooter may be sent via the communication device to external database 50. In addition, data related to operation of the scooter, such as from the sensors thereof, may be transmitted via the communication device 49. Further still, information and/or commands may be received via the communication device 49.

Figure 5:
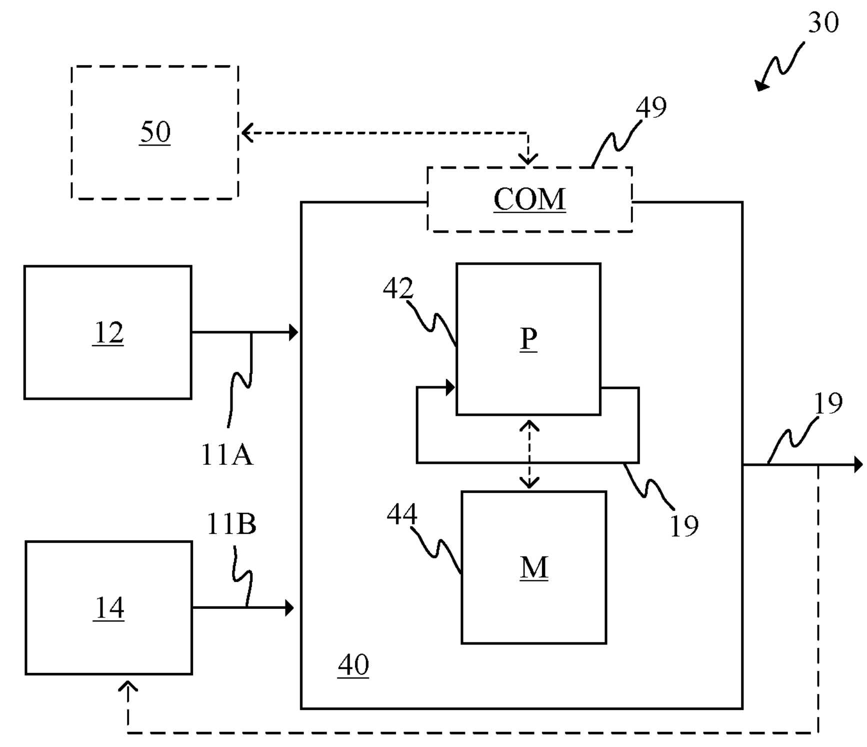
FIG. 5 illustrates schematically an electric scooter control system.

FIG. 5 illustrates schematically an electric scooter control system 30. Similar features can be included in the electric scooter control system 30 as described in connection with FIG. 4 and are, thus, not repeated herein.

FIG. 5, however, illustrates further possible features of the system 30. For example, electric scooter control system 30 may comprise a sensor unit 12. The sensor unit 12 may comprise at least one or several acceleration measurement sensors. Preferably, the sensor unit 12 is an inertial measurement unit that may be, for example, a three-axis inertial measurement unit, thereby comprising at least three-axis accelerometer(s) and, preferably, also three-axis gyroscope(s), or combination thereof. Furthermore, the inertial measurement unit may comprise magnetometer(s). Thus, the processing unit 42 and/or the electric scooter controller 40 may be arranged to receive, via its input, first input data 11A including information about the acceleration/deceleration of the scooter. Preferably, the acceleration/deceleration relates substantially directly to those of the scooter and not the rotational motion of one of the wheels of the scooter.

In addition, as visible in FIG. 5, the electric scooter control system 30 may comprise a motor controller 14. Alternatively, the motor controller 14 as referred to herein may refer only to measurement of a number of electrical quantities, such as motor voltage and/or current, of the motor. In addition, information related to rotational motion of the motor and/or one of the wheels of the scooter may be obtained by the motor controller 14. Thus, a motor or wheel encoder may be included in the scooter. The information may be obtained by the input or another input as the second input data 11B. Thus, information in the second input data 11B refers is more related to primary movement direction of the scooter when riding it, while the first input data 11A may register movement also in transverse directions related to the primary movement direction. It is to be noted that the movement data (shown as 11A) and the motor controller 14 data (shown as 11B) could be obtained via only one input by the electric scooter control system 30 if said data are merged.

Figure 6:
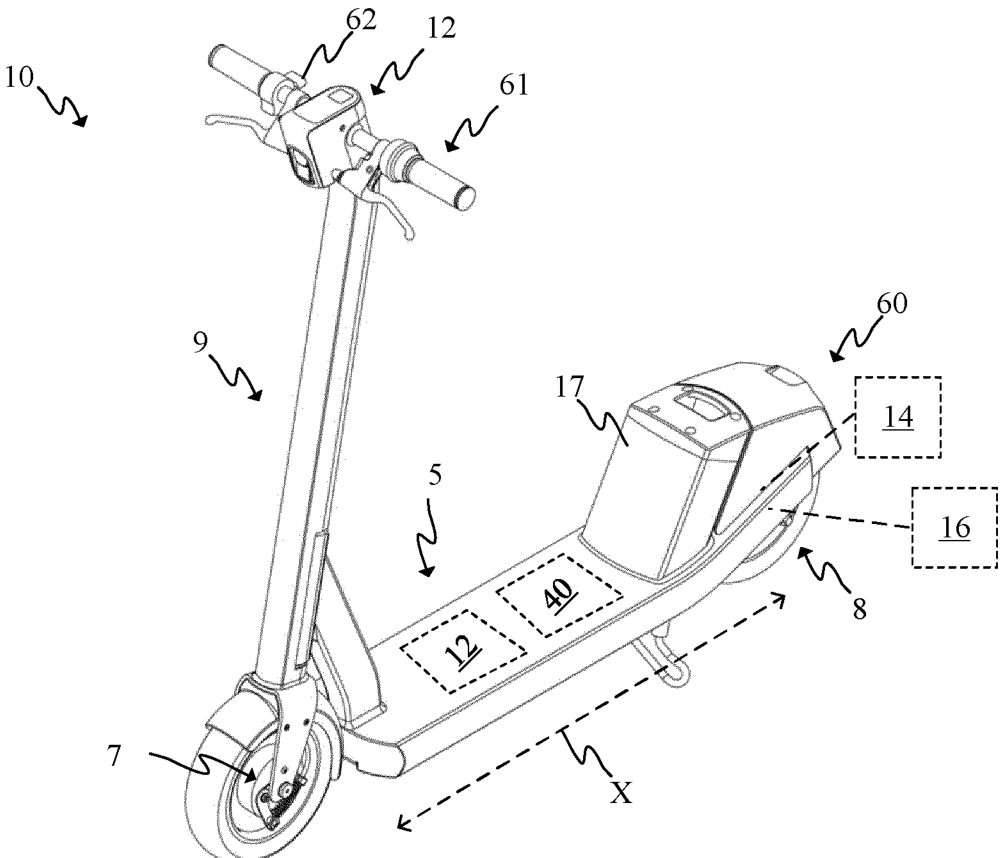
FIG. 6 illustrates schematically an electric scooter.

FIG. 6 illustrates schematically an electric scooter 10. The electric scooter 10 comprises the electric motor 16 (shown schematically in connection with the rear wheel in FIG. 6) and at least two wheels, wherein at least one of the wheels, such as the rear wheel, is arranged to be rotated by the electric motor 16. Furthermore, the electric scooter 10 comprises the electric scooter control system 30 for controlling one or various function-alities of the scooter 10. In various embodiments, the electric scooter 10 also comprises an electrical energy storage 17, such as including one or several electric batteries, for storing and providing electricity to operate the motor 16 and, optionally, other devices of the scooter 10, such as of the control system 30 thereof, and/or user interface(s), lights, etc., if any. The electric motor may be a conventional motor or a hub motor in the front and/or rear wheel.

The electric scooter control system 30 may comprise at least one control unit or device, such as the electric scooter controller 40. In some embodiments, the electric scooter control system 30 also comprises a motor controller 14 for controlling operation of the motor 16 and/or a sensor unit 12, such as an inertial measurement unit, or the motor controller 14 may at least measure motor voltage and/or current, and motor/wheel speed.

The motor controller 14 and/or the sensor unit 12 may preferably be in connection with the electric scooter controller 40, as shown in FIGS. 4 and 5. FIG. 6 shows schematically two places for the sensor unit 12, however, it could also be still elsewhere. The motor controller 14 may, preferably, be arranged in the vicinity of the motor 16, however, not necessarily. The motor controller 14 could, alternatively, be arranged, for example, close to the electric scooter controller 40.

In various embodiments, the electric scooter 10 may further comprise a frame 5, a front wheel support portion 7 for supporting at least one front wheel, and a rear wheel support portion 8 for supporting at least one rear wheel, wherein the front wheel support portion 7 and the rear wheel support portion 8 are coupled to the frame 5. Of course, wheels may have been provided to the wheel support portions.

In various embodiments, the primary movement direction X may about the direction defined by an imaginary line between the front wheel support portion 7 and rear wheel support portion 8.

In various embodiments, the electric scooter 100 may comprise a mud guard 60 at the rear wheel support portion 8, wherein, in the primary movement direction X, the mud guard 60 may be arranged further away from the front wheel support portion 7 relative to a distance between the front wheel support portion 7 and the rear wheel support portion 8.

Still further, as shown in FIG. 6, the electric scooter 10 preferably comprises a steering column 9 comprising a handlebar 61, wherein speed adjusting means 62 are coupled to the handlebar 61, and wherein the speed adjusting means 62 are at least in communication connection with the controlling system 30. The speed adjusting means 62 may be a lever or the like by which the speed setting may be regulated by the person riding the scooter 10.

The invention claimed is:

1. A method for detecting a tandem ride condition on an electric scooter, the scooter comprising an electric motor, the method comprising estimating a mass on the scooter for a current ride, wherein the estimation is based on:

determining, for longer than two seconds, and storing movement data of the scooter, the movement data including speed data of the scooter, determining force or power data of the motor, and applying a vehicle dynamics filter to select a time period of the stored movement data during which scooter motion has primarily been longitudinal, wherein the vehicle dynamics filter includes predefined criteria including the determined speed being equal to or higher than a speed threshold and force or power in the determined force or power data being higher than zero;

comparing the estimated mass to a statistical mass value determined based on stored data associated with a user profile, the stored data comprising one or more previously estimated masses of one or more previous rides associated with the user profile; and classifying current ride as exhibiting a tandem ride condition if the estimated mass of the current ride is higher than the statistical mass value.

2. The method of claim 1, wherein the movement data includes acceleration data measured by an inertial measurement unit of the scooter.

3. The method of claim 2, comprising comparing the force or power data and the acceleration data, and determining a coefficient based on the comparison.

4. The method of claim 2, wherein the acceleration data is measured by a 3-axis accelerometer of the inertial measurement unit.

5. The method of claim 1, wherein the speed data relates to a wheel speed of the scooter.

6. The method of claim 1, wherein the estimating comprises determining the force or power data based on electrical power of the motor and the speed data.

7. The method of claim 6, wherein the electrical power is determined by at least one or two of: motor current, motor voltage.

8. The method of claim 1, wherein the estimated mass is scaled by a correction factor, wherein the correction factor takes into account at least an electric scooter mass.

9. The method of claim 1, wherein the estimated mass is scaled by a correction factor, wherein the correction factor takes into account a driver mass.

10. The method of claim 1, comprising storing the estimated mass to a memory in association with the user profile.

11. The method of claim 9, wherein the driver mass is adapted based on previous estimated masses associated with the user profile.

12. An electric scooter control system comprising at least a processing unit and a memory, wherein the electric scooter control system is configured to execute the method of claim 1.

13. An electric scooter comprising:

an electric motor, at least two wheels, wherein at least one of the wheels is arranged to be rotated by the electric motor, and an electric scooter control system of claim 12.

* * * * *